Nov. 17, 1970 — J. A. BRINK, JR — 3,540,190
LIQUID MIST COLLECTION

Filed May 16, 1963 — 4 Sheets-Sheet 1

INVENTOR
JOSEPH A. BRINK, JR.
BY
ATTORNEY

INVENTOR
JOSEPH A. BRINK, JR.
BY Roger R. Jones
ATTORNEY

Nov. 17, 1970   J. A. BRINK, JR   3,540,190
LIQUID MIST COLLECTION

Filed May 16, 1963   4 Sheets-Sheet 3

INVENTOR
JOSEPH A. BRINK, JR.
BY
ATTORNEY

United States Patent Office 3,540,190
Patented Nov. 17, 1970

3,540,190
LIQUID MIST COLLECTION
Joseph A. Brink, Jr., St. Louis, Mo., assignor, by mesne assignments, to Monsanto Enviro-Chem Systems, Inc., Chicago, Ill., a corporation of Delaware
Continuation-in-part of application Ser. No. 779,535, Dec. 11, 1958. This application May 16, 1963, Ser. No. 280,847
Int. Cl. B01d 46/10
U.S. Cl. 55—97                    5 Claims

ABSTRACT OF THE DISCLOSURE

A process for separating and collecting mist from a gas. The gas is passed through bed of unbonded glass fibers having diameters of about 5–30 microns and compressed to a density of about 5–20 pounds per cubic foot. The mist is separated by the bed and flows by gravity to a collecting space.

---

This invention relates to the collection and removal of liquid mists from gases. More specifically, it relates to an improvement in methods for separating liquid mists from gases with inorganic fibers such as glass fibers. The invention is particularly useful with respect to the removal and recovery of acid mists (for example, sulfuric acid, phosphoric acid, etc., mists) from process gas streams. It is, however, not limited to use with such acid mists, but is broadly applicable to the collection of any liquid mists. The present application is a continuation-in-part of copending U.S. application Ser. No. 779,535, filed Dec. 11, 1958, now abandoned.

It has been previously proposed in U.S. Pat. No. 2,771,153 that a complex fiber bed having a first coarse fiber section and a second fine fiber section be employed to remove fine mists from gases containing the same. However, prior to this invention no fiber mist eliminator achieved any degree of commercial success for a number of reasons. A first such reason is that prior to this invention it was universally assumed that fine diameter glass fibers (i.e. about 2 microns) were required to remove small mist droplets from gases containing the same and such fine diameter fibers could not be satisfactorily employed for this purpose without a prohibitive back pressure because fine diameter fiber beds, as it is now well known, mat and become clogged with liquid which refuses to drain from the bed so that gas cannot be passed through the bed except by creating a high pressure differential. Even if such a high pressure differential is created so that the collected liquid is blown from the fiber bed, mist droplets were recreated on the exit side of the fiber bed so that the efficiency of the units is very low and operating cost very high.

A number of efforts have been made in the past to solve this problem as illustrated by the above mentioned U.S. Pat. No. 2,771,153. This patent proposed using a combination of a large diameter fiber bed and small diameter fiber bed, the latter being formed from fiber mats in which the fibers were resin bonded to each other. The fiber mats were very porous and drained properly so long as the resin bonding holding the fibers together was effective in preventing the fibers from matting. However, this proposed solution to the problem failed to attain any degree of commercial success because in almost every application the mist was of such a nature that the resin bonding of the fibers in the mat was soon weakened to the point that the mat collapsed and was no longer capable of functioning in the desired manner.

In accordance with this invention it has now been surprisingly found that (1) fine diameter fibers are not required to remove even the finest mist particles and that by employing a single relatively coarse diameter fiber bed even the smallest mist particles can be satisfactorily removed, (2) that a coarse diameter fiber bed if packed to the right density is surprisingly stable even without resin bonding of the fibers and does not shrink and mat even after prolonged use, and (3) that a coarse fiber bed even when packed to the density required for dimensional stability will not become flooded and that liquid collected on the fibers in the bed will drain free therefrom at the bottom of the bed as a continuous liquid phase. The last discovery is an important one because failure of the liquid to drain freely from the bed, as set forth above, will prevent efficient operation and require a high pressure differential across the bed. In view of the fact that efforts have been made to develop a low pressure drop fiber mist eliminator for many years and that all such efforts prior to the present invention were commercially unsuccessful, the above discoveries are believed to be truly surprising and unexpected.

In accordance with the present invention a finely divided mist is separated and collected from a gas in which the mist is disposed by passing the gas through a bed of inorganic fibers (preferably glass fibers) composed substantially entirely from fibers having diameters within the range of about 5 to 30 microns, the bed of fibers being compressed to a bulk density between about 5 and about 20 pounds per cubic foot. The mist is collected upon the surfaces of the fibers and is thereafter drained from the fiber bed by gravity flow as a continuous liquid phase and in substantially undiluted form so that steady state operation of the process is thereby achieved.

A preferred embodiment of the invention and two suitable forms of apparatus for practicing the same will now be described with reference to the accompanying drawings in which.

Figure 1:
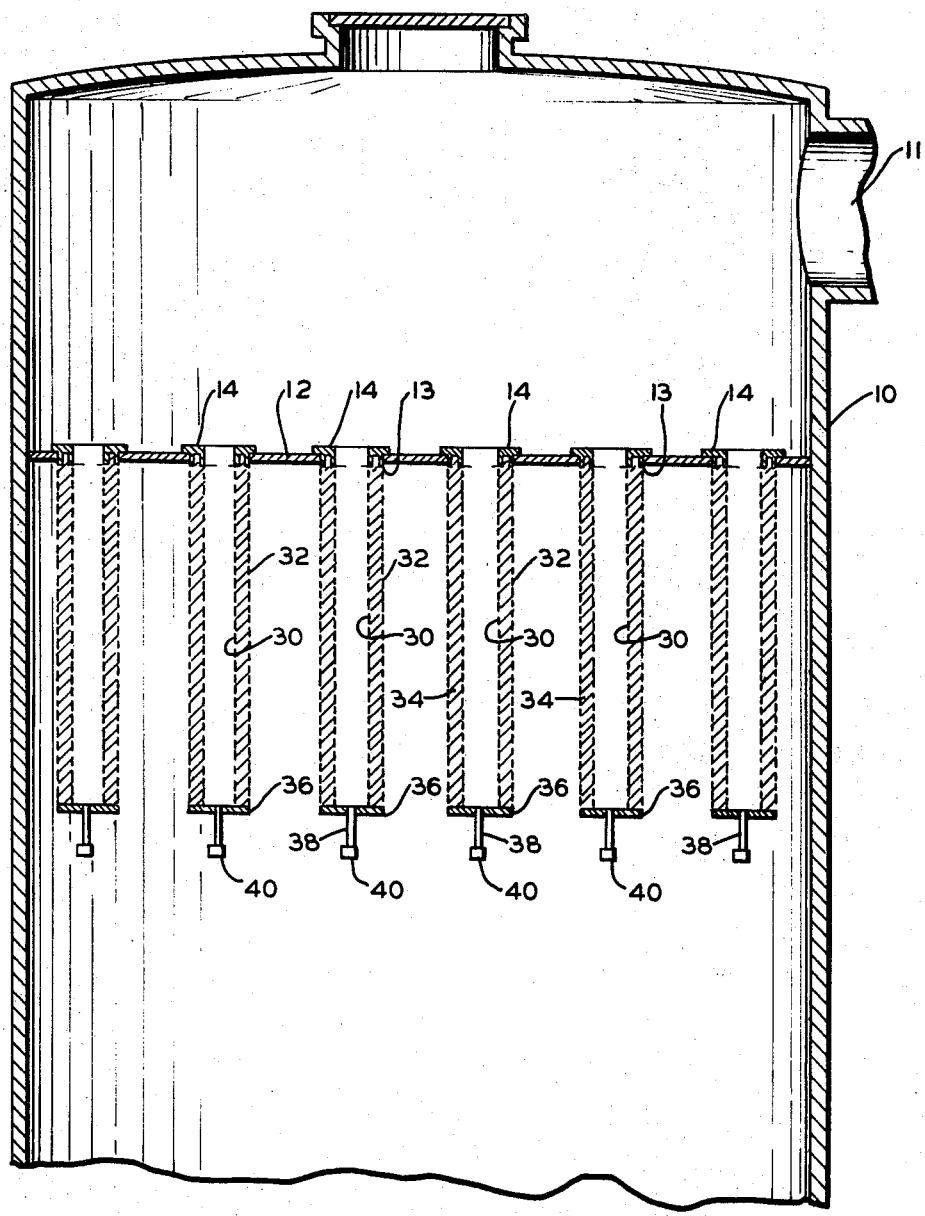
FIG. 1 is a cross sectional view of the upper portion of a sulfuric acid absorption tower in which is installed a plurality of elements designed for practicing the process of this invention for the removal of sulfuric acid mist from the gases from the sulfuric acid absorber which are to be passed to the stack.

With particular reference to FIG. 1 of the drawings there is illustrated the upper portion of the outer shell of a sulfuric acid absorption tower 10 in which $SO_3$ vapors are absorbed in water or dilute sulfuric acid to form 99% sulfuric acid in a manner well known in the art. As is also well known in the art, this reaction creates large volumes of sulfuric acid mist in which very fine droplets of sulfuric acid are suspended in the effluent gases from the absorber. An exhaust means 11 is provided for removing the gases from the tower.

Figure 2:
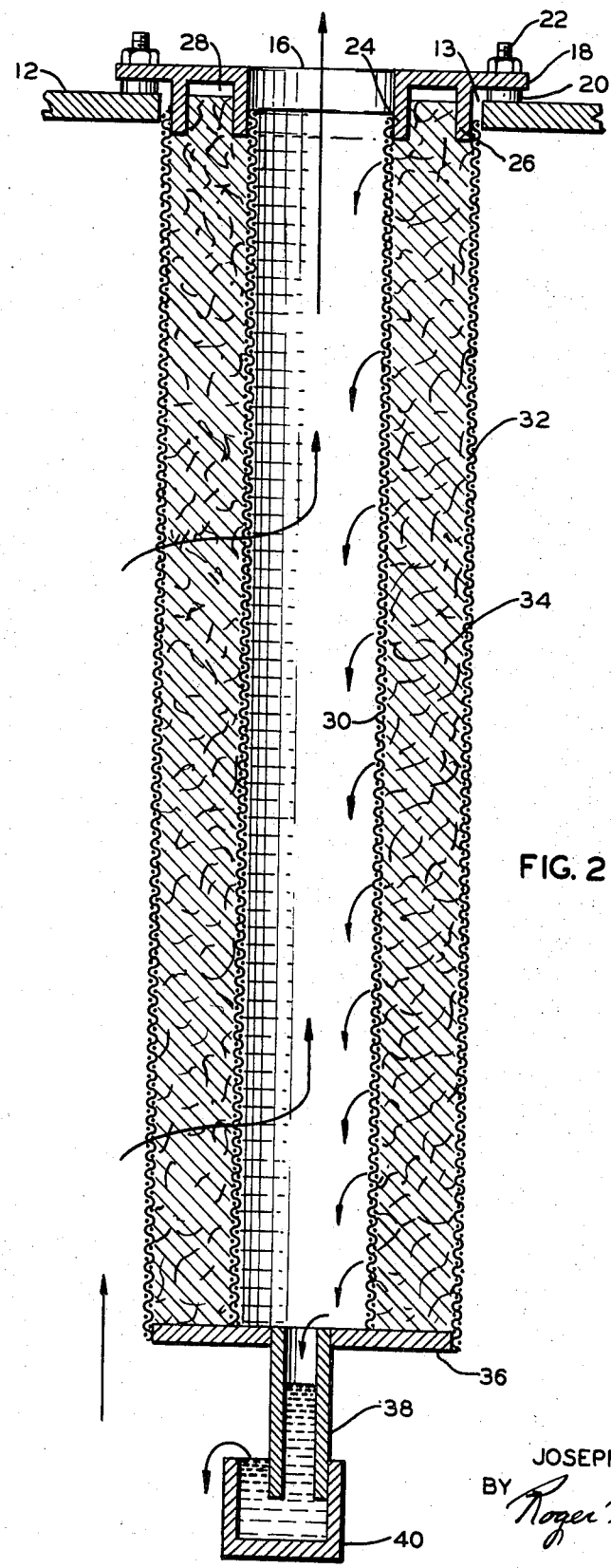
FIG. 2 is an enlarged cross sectional view of one of the fiber mist eliminator elements employed in the apparatus of FIG. 1.

Secured by any suitable means such as welding to the inner walls of absorption tower 10 is a perforated support plate 12 having a plurality of evenly spaced openings 13. The openings 13 in the support plate 12 are of a diameter suitable for receiving in each instance a mist eliminator element 14 which serves to allow passage of gases through the openings 13 in the support plate 12 while removing the mist carried by the gas. With particular reference to FIG. 2 of the drawings, the mist eliminator units 14 in each instance comprise an upper annular retaining member 16 which is provided with a laterally extending flange 18 of larger outside diameter than the openings 13 in support plate 12 such that the flange 18 operatively rests upon an annular gasket 20 surrounding the openings 13 in support plate 12. The annular member 16 can be secured to the support plate 12 by any suitable means such as bolts 22.

Depending from the under side of annular member 16 are two concentric protrusions 24 and 26 which provide an annular inverted recess 28 into which is inserted one end of each of two concentric screens 30 and 32. The screens 30 and 32 act as retainers for an inorganic fiber bed indicated by the reference numeral 34. The lower ends of the screens are retained into position by a base plate 36 which can be secured to the screens in any suitable manner. Base plate 36 also serves as a retaining member for bed 34 so that the fibers do not fall from the bed due to the force of gravity.

Extending centrally through base plate 36 and depending downwardly therefrom is a conduit 38 which operatively serves to drain liquid from the enclosure created by base plate 36, screens 30 and 32 and bed 34. The conduit 38 extends into a seal pot 40 which is closed at its lower end and which in operation is filled with liquid so that gas is prevented from passing through conduit 38.

In operation mist laden gases created in the absorption tower 10 pass laterally through screen 32, bed 34 and screen 30 which results in the mist in the gases being collected upon the surface of the fibers in bed 34. The cleaned gas then flows upwardly through the openings 13 in plate 12 and passes out through the exhaust 11 of the absorption tower 10. Bed 34 is of such density and is formed of fibers such that the liquid collected upon the fibers drains from the bed by gravity flow. Due to the existence of a pressure drop across the bed of fibers, the liquid moves inwardly from the bottom of the bed, rather than falling over the edge of base plate 36, and passes through conduit 38 as a continuous liquid phase in substantially undiluted form. In other words the liquid in seal pot 40 during operation is recovered sulfuric acid which would otherwise be wasted and from the liquid seal pot 40 the recovered sulfuric acid overflows and is returned to the lower portion of the absorption tower.

Figure 3:
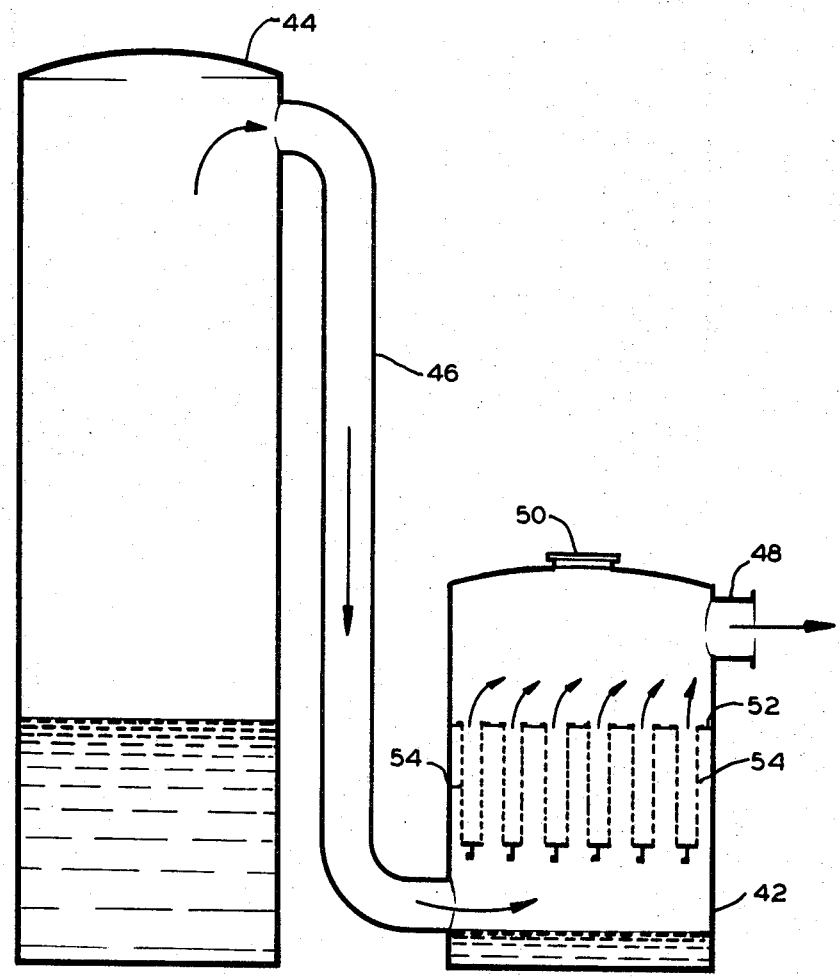
FIG. 3 is a modified form of apparatus designed to practice the process of this invention for removing sulfuric acid mist but in which the mist eliminator is separated from the sulfuric acid absorption tower.

With reference to FIG. 3 of the drawings there is illustrated a modification of an apparatus as previously described which is particularly useful in connection with sulfuric acid plants already in existence. In accordance with this modification a tank member 42 which can be of stainless steel or the like is positioned adjacent a standard sulfuric acid absorption tower 44 and is operatively connected thereto by means of a conduit 46 which brings mist laden gases from the upper end of the absorption tower 44 to the lower portion of tank 42. Tank 42 is provided with an outlet means 48 generally similar to the outlet means 11 of FIG. 1 and a manhole cover 50 which provides access to the interior of the tank 42.

Secured to the inside wall of tank 42 is a laterally extending perforated plate 52 which generally corresponds to the plate 12 of the apparatus previously described. A plurality of mist eliminator units 54 generally similar to the units 14 previously described are mounted in the plate 42 and serve in the manner previously described for removing mist passing through the mist eliminator unit.

In operation, mist laden gases from the absorption tower 44 are passed to tank 42 by means of conduit 46 and are thereafter passed through the mist eliminator units 54 and out exhaust means 48. The mist contained in the gases as they passed through the units 54 is thereby recovered in the manner previously described and drains into the bottom of tank 42. The recovered acid can then be used as is or returned to the process for the absorption of additional sulfur trioxide.

Figure 4:
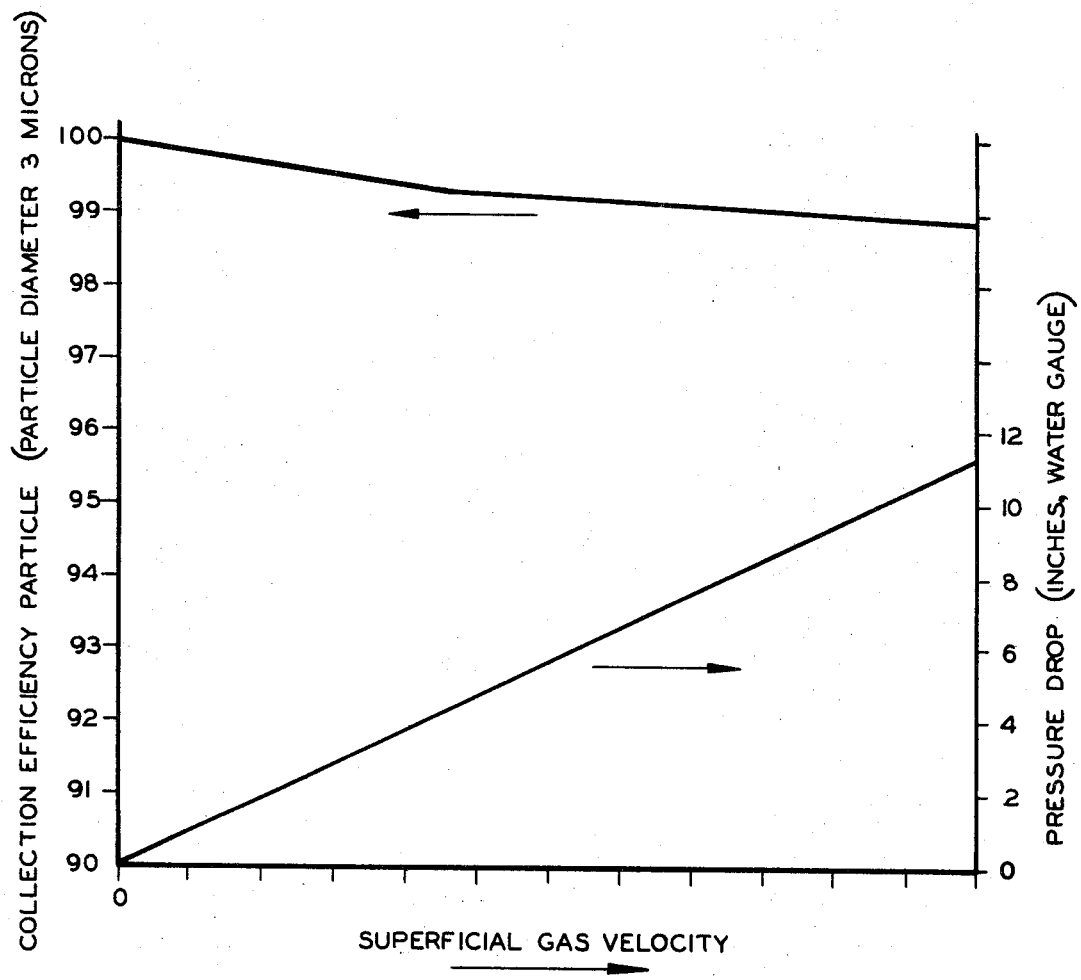
FIG. 4 is a graph showing collection efficiency of a fiber element for practicing the process of this invention at various superficial gas velocities through the fiber element.

With particular reference to FIG. 4 of the drawings it will be seen that the collection efficiency of the process of this invention is not greatly dependent upon the superficial gas velocity through the bed of fibers and quite unexpectedly the maximum collection efficiency occurs when the superficial gas velocity approaches zero and the pressure drop across the bed of fibers approaches zero. In other words, the superficial gas velocity through the bed of fibers is proportional to the pressure drop across the bed of fibers and when the pressure drop is substantially 0, the superficial gas velocity is substantially 0, and collection efficiency is substantially 100%. Of course the process is normally conducted with a small pressure drop across the fiber bed and with an appreciable superficial gas velocity through the bed even though collection efficiency is thereby slightly impaired since this reduces the size of the mist eliminator element required to treat large volumes of gases. However, even with a pressure drop across the fiber bed equal to several inches of water the mist collection efficiency is about 99% and this is considerably in excess of the efficiency attainable with any previously available type of commercial apparatus.

From FIG. 4 of the drawing it will be seen that from an operating point of view any selected velocity through the bed is satisfactory in a process according to this invention. The most advantageous velocity to be employed in any given instance will depend upon the volumes of gases to be treated, the collection efficiency required, money available for capital expenditure and similar factors and can readily be determined by those skilled in the art. The same is true of other process variables such as bed thickness and the only critical process variables are fiber diameter and packing density.

Fibers which can be utilized in the process of this invention are inorganic non-metallic fibers having a diameter within the range of about 5 to 30 microns. The bed should contain substantially no fibers of a diameter of less than about 5 microns because the presence of any appreciable quantity of such fibers results in flooding of the bed so that the process cannot be conducted as desired. Fibers of diameters larger than 30 microns are generally not desirable for the reason that they tend to break when compressed to the densities required in accordance with this invention.

The chemical nature of the fibers is not too important as long as they possess sufficient rigidity to withstand cold flow when placed under compression for extended periods of time. The selection of a particular fiber to be used in any specific set of circumstances will depend upon factors such as cost, resistance to attack by particular chemical agents or mists being collected, or other factors which will be readily ascertainable by those skilled in the art. For most applications glass fibers will be found to be most satisfactory since they are readily available in the desired diameters and are quite resistant to attack by acids.

A bed of fibers to be employed in accordance with this invention should be compressed such that it has a density at least two or three times the bulk density of the uncompressed fibers. In the case of glass fibers or other fibers similar in density and other characteristics the bed should be packed to a density of about 5 to 20 pounds per cubic foot. In general the smaller diameter fibers will require higher packing densities than larger diameter fibers. Thus with fibers having diameters in the ranges of from 5 to 15 microns, packing densities of from about 8 to 20 pounds per cubic foot are preferred, and with fibers having diameters in the range of from 15 to 30 microns packing densities of from about 5 to 10 pounds per cubic foot are most satisfactory. A particularly preferred embodiment of this invention involves the use of fibers having diameters of from about 8 to about 20 microns compressed to a packing density of between about 7 and about 12 pounds per cubic foot.

The inorganic fiber beds can be compressed readily by applying a compressive force against the bed in one direction while confining the bed to a constant cross sectional area normal to the direction of applied compressive force. The magnitude of force required will depend both upon the particular fiber selected, as well as the size of the bed being compressed. For example, a fiber bed made up of 20 micron fibers, having a circular cross sectional area of one square foot, and having an uncompressed depth of 12 inches, will require a force of about 250 pounds to increase the packing density from an uncompressed value of 2 pounds per cubic foot to the desirable value of 8 pounds per cubic foot.

As indicated above, the present invention is particularly useful in treating gases containing high concentrations of liquid mists, since the fiber beds described herein lend themselves to operations wherein the liquid mists are continuously drained from the beds. In order to prevent such liquids from flooding the beds, it is generally desirable to avoid upward flow of the gases through the bed. Either horizontal or downward flow of gas is satisfactory, but horizontal flow is often preferred for practical reasons. By downward gas flow is meant, of course, a direction of flow having at least some vector component in a downward direction.

The following specific embodiment of the invention is set forth as an example of one of the best modes for carrying out the invention:

The off gases from a sulfuric acid plant were found to contain 20 milligrams of acid mist per standard cubic foot of gas, the mist having particle sizes such that 99% were less than 3 microns. This mist was removed from the gas by passing the mist laden gas at a superficial gas velocity of 15 feet per minute horizontally through a three inch thickness of 8 micron fibers packed to a density of 10.7 pounds per cubic foot. The fiber bed was packed by compressing the fibers under a pressure of about 25 pounds per square inch. After a week of passing the mist laden gases through the compressed fiber bed, steady state conditions were reached under which better than 99.4% of the mist originally in the gas was continuously freely draining from the fiber bed. Under the steady-state conditions the hold-up of liquid acid in the bed was about 17 pounds per cubic foot of bed. The pressure drop across the bed was about 6 inches of water. This steady state operation was continued for over 3 months without matting of the fibers in the bed and without any appreciable change in collection efficiency or pressure drop.

From the foregoing example, it is apparent that this invention provides a unique method for highly effective removal of very small droplets of mist (thereby reducing atmospheric contamination or purifying a process gas stream for other reasons), while simultaneously allowing economic recovery of the mist without dilution or other contamination and in a concentrated usable and/or salable form.

What I claim is:

1. A process for separating and collecting a finely divided mist from a gas in which said mist is dispersed, which process comprises passing said gas through a bed of unbonded glass fibers having fiber diameters between about 5 and about 30 microns, said fiber bed being compressed to a bulk density of between about 5 and about 20 pounds per cubic foot, and concurrently draining liquid resulting from the collection of said mist from said bed by gravity flow in substantially undiluted form and as a continuous liquid phase to thereby effect steady state operation.

2. A process according to claim 1 wherein said gas is passed through said glass fiber bed in a direction other than upward.

3. A process according to claim 2 wherein said glass fibers have diameters between about 8 and about 20 microns and wherein the bulk density of the fiber bed is between about 7 and about 12 pounds per cubic foot.

4. A process according to claim 2 wherein said glass fibers have diameters between about 5 and about 15 microns and wherein the bulk density of the fiber bed is between about 8 and about 15 pounds per cubic foot.

5. A process according to claim 2 wherein said glass fibers have diameters between about 15 and about 30 microns and wherein the bulk density of said fiber bed is between about 5 and about 10 pounds per cubic foot.

References Cited
UNITED STATES PATENTS

| | | |
|---|---|---|
| 1,463,990 | 8/1923 | Wilson. |
| 2,520,124 | 8/1950 | Chaney et al. |
| 2,629,459 | 2/1953 | Hammond et al. |
| 2,771,153 | 11/1956 | Hennig. |

OTHER REFERENCES

Lange's Handbook of Chemistry, 9th ed., published by McGraw-Hill Book Co., New York, 1956, pp. 878–879.

SAMIH N. ZAHARNA, Primary Examiner

Dedication 3,540,190.—*Joseph A. Brink, Jr.*, St. Louis, Mo. LIQUID MIST COLLECTION. Patent dated Nov. 17, 1970. Dedication filed Aug. 9, 1973, by the assignee, *Monsanto Enviro-Chem Systems, Inc.*

Hereby dedicates to the Public the entire remaining term of said patent.

[*Official Gazette December 25, 1973.*]